United States Patent [19]
Linstead et al.

[11] Patent Number: 5,548,753
[45] Date of Patent: Aug. 20, 1996

[54] AUTOMATIC ELECTRONIC MAIL NOTIFICATION OF DATABASE EVENTS

[75] Inventors: Steven A. Linstead, North Prairie; Gregory B. James, Milwaukee, both of Wis.

[73] Assignee: Johnson Service Company, Milwaukee, Wis.

[21] Appl. No.: 305,773

[22] Filed: Sep. 14, 1994

[51] Int. Cl.$^6$ .................. G06F 15/167; G06F 15/17; G06F 3/14
[52] U.S. Cl. ............................ 395/600; 395/154
[58] Field of Search .................. 395/600, 154; 364/419.17; 382/13

[56]           References Cited
                U.S. PATENT DOCUMENTS

| 5,063,600 | 11/1991 | Norwood | 382/13 |
| 5,307,456 | 4/1994 | MacKay | 395/154 |
| 5,341,293 | 8/1994 | Vertelney et al. | 364/419.17 |

OTHER PUBLICATIONS

Inside Macintosh / AOCE Application Interfaces / Chapter 1—Introduction to the Apple Open Collaboration Environment / Apple Computer, Inc., Software Development Kit, Developer Press, pp. 1–1 to 1–19, Oct. 4, 1993.

*Primary Examiner*—Thomas G. Black
*Assistant Examiner*—Cheryl R. Lewis
*Attorney, Agent, or Firm*—Harness, Dickey & Pierce, P.L.C.

[57]                ABSTRACT

The invention provides a method for providing an indication of the occurrence of events within a database system. The database system stores data accessible by a plurality of users and in a plurality of data formats. The method comprises the steps of periodically reading a storage location within the database, detecting a data structure stored in the storage location and reading the data structure. The method further includes the steps of converting the data structure from the first data format to a second data format and providing the indication to at least one user, the indication including at least a portion of the data structure.

17 Claims, 2 Drawing Sheets

5,548,753

AUTOMATIC ELECTRONIC MAIL NOTIFICATION OF DATABASE EVENTS

BACKGROUND OF THE INVENTION

The present invention generally relates to a method for communicating information in a database. The present invention more particularly relates to a method for automatically providing notification to a user of the occurrence of a predetermined event within a database system operated in conjunction with a processing system.

A database is a collection of related information about a subject organized in a manner to facilitate operations such as retrieving information, drawing conclusions, and making decisions. Computerized databases are commonly used for storing data and making information available in a variety of formats to many users. As one example, a database may contain data pertaining to an inventory and purchasing system. Users may access the database to receive information about inventory on hand, orders which have been placed, and orders which have been filled.

Information in a database is usually divided into distinct data records, each with one or more data fields. Data are stored in the database in a variety of formats or as different kinds of data. For example, data may be stored as characters, in bytes composed of eight bits. Data may also be stored as integers, in two or more bytes; as long integers in four or more bytes; as strings, including up to 255 bytes; as text of up to 32,000 bytes; as real numbers; and as boolean values. In some databases, data may also be stored as a picture. The 4th Dimension™ relational database program, developed by ACI US, Inc., for Macintosh™ Computers, allows storage of picture data in the 4th Dimension database. In the 4th Dimension database, data which is not classified as one of the other types (character, integer, etc.) must be stored as a picture.

Computerized database systems are generally implemented in processing systems which include a processor and a memory, along with input and output devices. The processor operates in response to programs of instructions stored in the memory. The programs of instructions include the operating system, which is the program which controls processor internal functions, and the database system. The database system includes the database as well as a database management program or database engine. The database engine provides tools for retrieval, modification, deletion and insertion of data. These tools include application programs for manipulating data. The database engine includes one or more programs of instructions for controlling the processor, and the database includes a plurality of storage locations in the memory for storing data.

The computerized database may be implemented on a personal computer. For example, as noted, the 4th Dimension database program may be implemented on the Apple Macintosh personal computer, manufactured by Apple Computer, Inc. The personal computer may be operated on a network with other processing systems such as personal computers or mainframe computers. Different portions of the database system may be located on different processing systems on the network with the cooperation of the different processing systems being transparent to the user. Multiple users, using the same processing system or different processing systems on a network, may access data in the database. A master copy of the database may be maintained in a personal computer configured as a server. The master copy is accessible by users of personal computers configured as clients to the server. Data may be conveyed between users or between client and server for information, for approval, or for other reasons.

Users of a database system, such as the 4th Dimension database program, may write "externals", or external programs, for manipulating data in the database. An external may be, for example, a program of instructions in a programming language such as C or Pascal which allows the user to add operational features to the database. Such externals may be accessed or called by applications programs of the 4th Dimension database system. Also, such externals may access portions of the operating system of the personal computer. For example, an external operating on a Macintosh computer in conjunction with a 4th Dimension database located on the Macintosh computer may access the Macintosh System 7 operating system for manipulating data in the database.

In some applications, there is a need to provide information about miscellaneous database events to one or more persons or organizations. Such information may be text, graphics or other content. The information may notify the recipient of another user's database entry, the application of a digital signature, or other event.

Many processing systems provide electronic mail, or e-mail utilities for communicating messages or files among users on a network. Electronic mail is a form of store and forward messaging in which the recipient need not be present or active when the message is sent. The message will be stored on the network and forwarded to the user when the recipient is available. Electronic mail systems generally provide for sending a text message and/or one or more files to one or more recipients. Other recipients may be designated to receive "carbon copies" of the message or files. Still other recipients may be designated to receive "blind carbon copies" of the message or files.

For example, Apple Computer, Inc. provides Apple-Mail™ and PowerTalk™ software enabling messaging and electronic mail. These capabilities are part of a broader technology known as the Apple Open Collaboration Environment (AOCE™).

Despite the availability of communication tools for users of processing systems, there remains a need for communicating information among users of a database system operated on the processing system. In particular, there is a need for a way to provide automatic notification of the occurrence of miscellaneous events within the database environment to one or more users who may be interested in those events.

For example, in an inventory and purchasing system, a purchase order may be prepared within the database and provided electronically to the preparer's supervisor for authorization. There is a need to automatically inform the supervisor that the purchase order is awaiting attention, even at times that the supervisor is not actively using the database. After authorization by the supervisor, there may be a need to automatically inform the preparer of this fact and to inform other interested users, such as users responsible for accounting and purchasing.

SUMMARY OF THE INVENTION

The present invention provides a method for supporting mail services from within a database application. The database system stores data, the data being accessible by a plurality of users, the data being stored in a plurality of data formats. The plurality of data formats includes a first data format. The method comprises the steps of periodically reading a predetermined storage location within the database, detecting a data structure stored in the predetermined storage location and reading the data structure. The method further comprises the steps of converting the data structure from the first data format to a second data format and providing the indication to at least one user of the plurality of users, the indication including a least a portion of the data structure.

The present invention is particularly adapted for use with the 4th Dimension database system available from Acius, Inc., operated on a Macintosh personal computer, available from Apple Computer, Inc.

A daemon process, or pseudo user may be created to operate in a programming loop, repetitively watching for the occurrence of a predetermined event within the 4th Dimension database. For example, the predetermined event may be receipt or approval of a previously prepared document. Occurrence of the predetermined event results in the writing of a record in a table in the database. The daemon process detects this record, reads the record, and prepares an electronic mail message. The message is passed to the electronic mail routines that are a part of the Macintosh operating system.

It is, therefore, an advantage of the present invention to provide automatic electronic mail notification to users of processing systems on a network. The notification may consist of computer files, text messages or text messages with one or more enclosures. The files may consist of audio, video, pictures, text or combinations of these.

It is a further advantage of the present invention to provide electronic notification to a single recipient or a group of recipients. It is a further advantage to provide "carbon copies" to individuals or groups and "blind carbon copies" to individuals or groups.

Further advantages and features of the present invention will be apparent from the following specification and claims when considered in connection with the accompanying drawings illustrating the preferred embodiment.

BRIEF DESCRIPTION OF THE DRAWINGS

For purposes of clarity and ease in understanding the present invention, like elements will be identified by like reference numerals in the various drawings.

DETAILED DESCRIPTION OF THE PREFERRED EMBODIMENT

Figure 1:
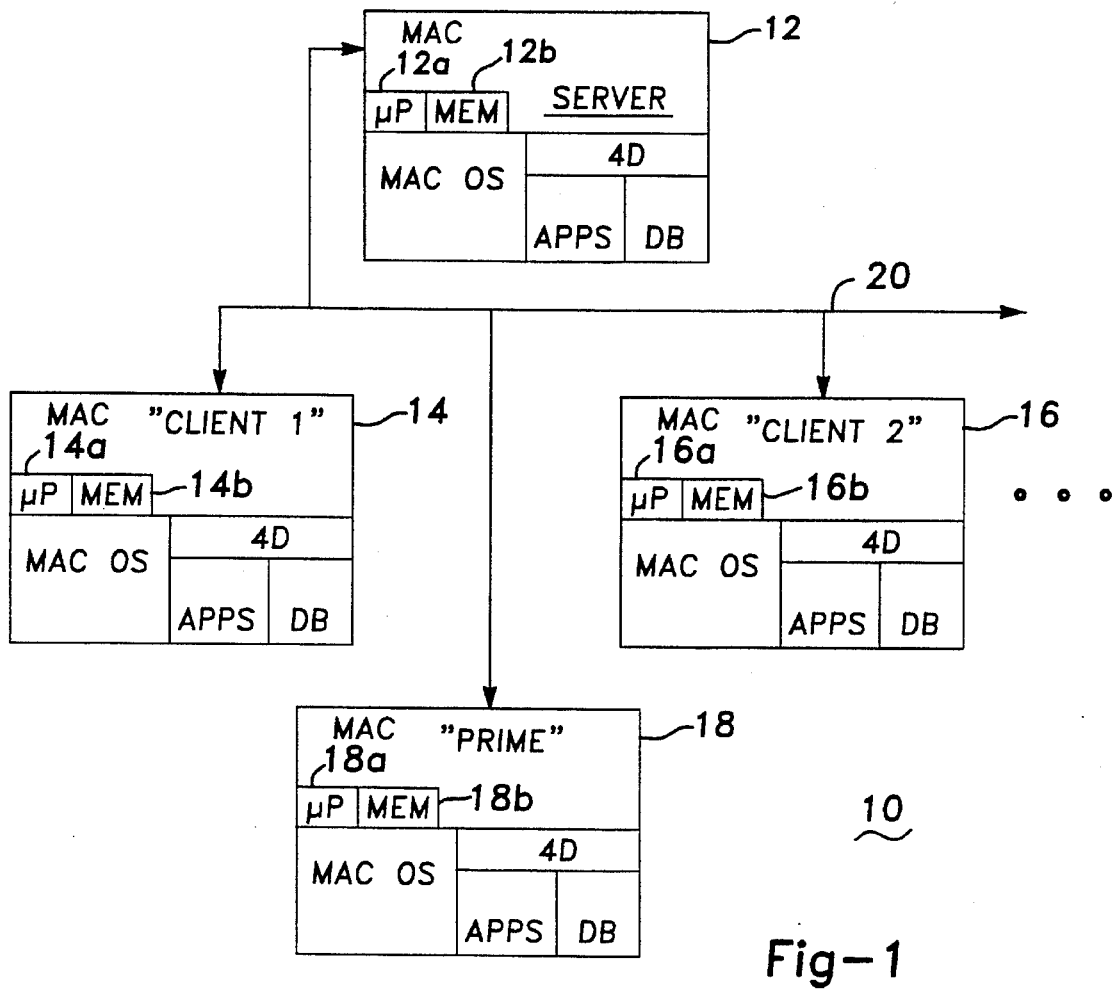
FIG. 1 is a functional block diagram illustrating a network of processing systems in which the present invention may be used.

FIG. 1 is a functional block diagram illustrating a network 10 of processing systems 12, 14, 16, 18 in which the present invention may be used. The network 10 may also include other processing systems and other processing equipment, such as printers or modems (not shown in FIG. 1). Each of the processing systems 12, 14, 16, 18 is coupled with a connecting network 20 and is configured for communicating over the connecting network 20 with other components of the network 10, such as other processing systems as well as printers or modems.

As indicated in FIG. 1, each of the processing systems 12, 14, 16, 18 is preferably a Macintosh personal computer, available from Apple Computer, Inc. Each of the processing systems 12, 14, 16, 18 is preferably running the 4th Dimension database system available from Acius, Inc. However, one or more of the processing systems 12, 14, 16, 18 could be other than a Macintosh or could include application programs other than the 4th Dimension database system. The Macintosh personal computers which form the processing systems 12, 14, 16, 18 each include a processor 12a, 14a, 16a, 18a and a memory 12b, 14b, 16b, 18b. The processor 12a, 14a, 16a, 18a operates according to programs of instruction stored in the memory 12b, 14b, 16b, 18b. The structure and operation of the processing systems 12, 14, 16, 18 will be discussed in greater detail in conjunction with FIG. 2.

As can be seen in FIG. 1, the network 10 preferably is organized in a client-server configuration. The processing system 12 operates as the server and the processing systems 14, 16, 18 each operate as clients. The server and associated clients each preferably run substantially identical software programs. However, the server stores data which is commonly used by each of the clients, and provides additional control features for the network 10. Preferably, the network 10 operates according to the PowerTalk System Software, sold by Apple Computer, Inc. as part of the Apple Open Collaboration Environment (AOCE). Moreover, preferably the processing system 12 which is operated as a server implements the PowerShare Collaboration Server software to provide mail, messaging, and catalog services to the network 10.

The processing system 18 is preferably configured to execute a daemon process. Whereas the processing systems 14, 16 are operated by users and require human intervention for operation, the daemon process 18 generally operates only under software control and without human intervention. The daemon process 18 may be given a network identifier, such as "PRIME." The processing systems 14, 16 may also be given network identifiers such as "Client 1" and "Client 2," which uniquely identify the processing systems 14, 16 on the network 10.

Figure 2:
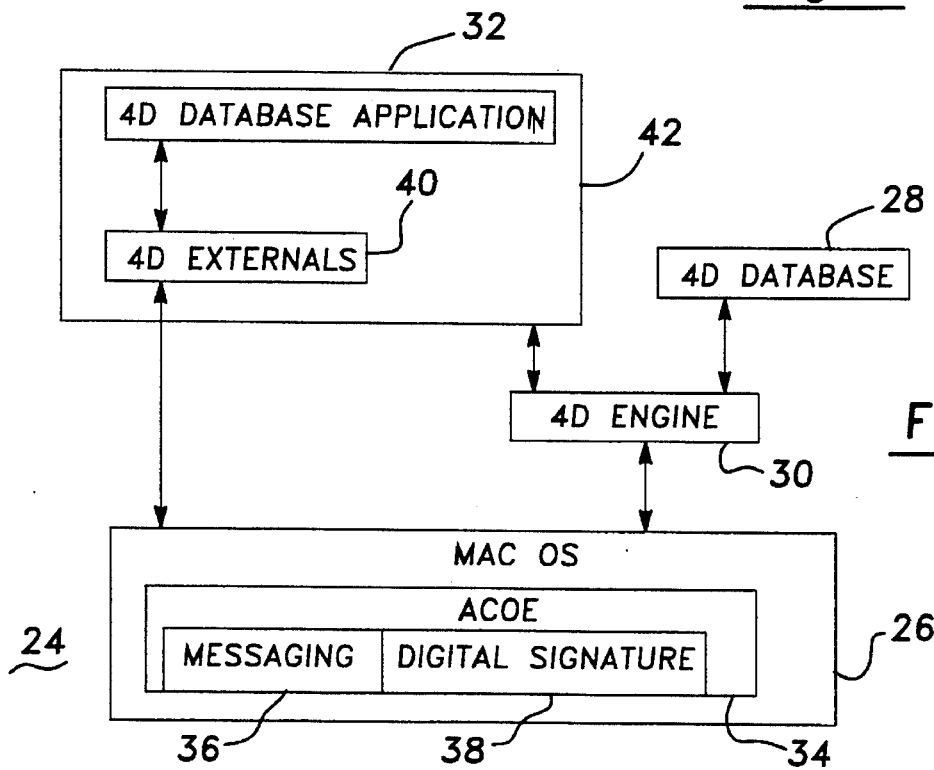
FIG. 2 is a functional block diagram illustrating a processing system in which the method of the present invention maybe used.

FIG. 2 is a functional block diagram illustrating a processing system 24 for use with the present invention. For example, the processing system 24 may implement one or more of the processing systems 12, 14, 16, 18 of FIG. 1. In FIG. 2, the processing system 24 includes a Macintosh operating system 26, a 4th Dimension database 28, a 4th Dimension database engine 30, and 4th Dimension database applications 32. Each of these may include one or more programs of instruction for controlling a personal computer which implements the present invention.

The Macintosh operating system 26 is an industry standard control program for controlling the Apple Macintosh computer. As is well known, the Macintosh operating system 26 provides control programs for manipulating files, displaying data, communicating with other devices and other system-level operations. The Macintosh operating system 26 includes functions or subroutines which are programs of instructions which may be called by other programs to perform standard operations on data or files.

The Macintosh operating system 26 preferably includes an Apple Open Collaboration Environment (AOCE) portion 34. AOCE portion 34 is a group of programs available from Apple Computer, Inc., which allow messaging, electronic mail and other operations among a network 10 of processing systems (FIG. 1) such as the processing system 24. For example, the plurality of processing systems may be coupled together on a local area network such as network 10. The AOCE portion 34 allows data and other information to be conveyed on the connecting network 20 (FIG. 1) among the processing systems of the network 10. The AOCE portion 34 includes a messaging portion 36 for controlling receipt, transmission and formatting of messages between the processing system 24 and other processing systems, and a digital signature portion 38.

The messaging portion 36 includes utility programs for implementing an electronic mail system on the processing system 24. For example, the messaging portion 36 may receive a text string which forms a message to be communicated from the user of the processing system 24 to one or more users of other processing systems on the network 10 (FIG. 1). Also, the messaging portion 36 may receive one or more files which may be communicated with a message to another user on the network 10. Alternatively, the messaging portion 36 may transmit one or more files with no message content. Still further, the messaging portion 36 may receive electronic mail messages from the network and provide them in a format understandable to the user of the processing system 24. The messaging portion 36 may comprise the AppleMail electronic mail program available from Apple Computer, Inc.

The messaging portion 36 preferably receives a plurality of data structures which define the elements of an electronic mail message. These data structures include the following: the subject or heading of the message; the identifier of the sender of the message; a list of one or more recipients of the message; a list of one or more "carbon copies" of the message; a list of one or more "blind carbon copies" of the message; a list of files to add to the message as enclosures and the enclosure files themselves. The data structures may be provided to the messaging portion 36 by a user interaction with an electronic mail program such as AppleMail, or by one or more applications programs running on the processing system 24. The messaging portion 36 combines the received data structures to produce an electronic mail message having a format recognized by other processing systems. The electronic mail message is then conveyed from the processing system 24 to the specified recipients.

The Macintosh operating system 26 has particular facilities for processing graphical data. The Macintosh computer has a graphical user interface. Thus, graphical data such as pictures are important to the programs needed to communicate with users. For example, the Macintosh computer includes QuickDraw™, an application program interface built into the Macintosh operating system 26 that defines object-oriented graphic routines so that graphics, windows and menus can be displayed on-screen in the same way by any application program. QuickDraw has routines for drawing lines, circles, defining colors, drawing text and so forth. Using QuickDraw calls, an application can create an image on an output device, such as a monitor or printer. To save graphical images, the Macintosh operating system 26 recognizes a PICT data structure and a PICT file format. The PICT file format is an object-oriented graphic file format that draws on information available in the Macintosh computer's QuickDraw toolbox. The PICT data structure provides a way to save graphical data in a form that is accessible by any other program that might need to use it.

The 4th Dimension database 28 and the 4th Dimension database engine 30 together form a database management system. The 4th Dimension database 28 stores a collection of related information about a subject, organized in a useful manner. The 4th Dimension database engine 30 is a database management program that provides tools for retrieving, modifying, deleting and inserting data in the 4th Dimension database 28. For example, the 4th Dimension database 28 may store inventory information, including a list of stocked parts and an associated list of on-hand quantities of each stocked part. The 4th Dimension database engine 30 includes tools, such as programs of instructions, for manipulating the data in the 4th Dimension database 28. For example, the 4th Dimension database engine 30 may include a program to allow sorting of the inventory information according to different criteria.

The 4th Dimension database applications 32 include custom programs known as applications which control the 4th Dimension database engine 30 to accomplish a specific purpose. For example, one application might implement an inventory purchasing system. Such an application would access inventory information stored in the 4th Dimension database 28 using the tools provided by the 4th Dimension database engine 30. The application monitors inventory levels for specific parts. When inventory falls below a predetermined level which is defined in the application, the application prepares a purchase order in response to a low inventory condition.

4th Dimension externals 40 are programs written in a language such as C or Pascal which allow the addition of operational features to the 4th Dimension database system. In particular, 4th Dimension externals 40 may access software routines and other tools in the Macintosh operating system 26, including the messaging portion 36. 4th Dimension externals 40 may themselves be called or accessed by one or more applications in the 4th Dimension database applications 32.

Figure 3:
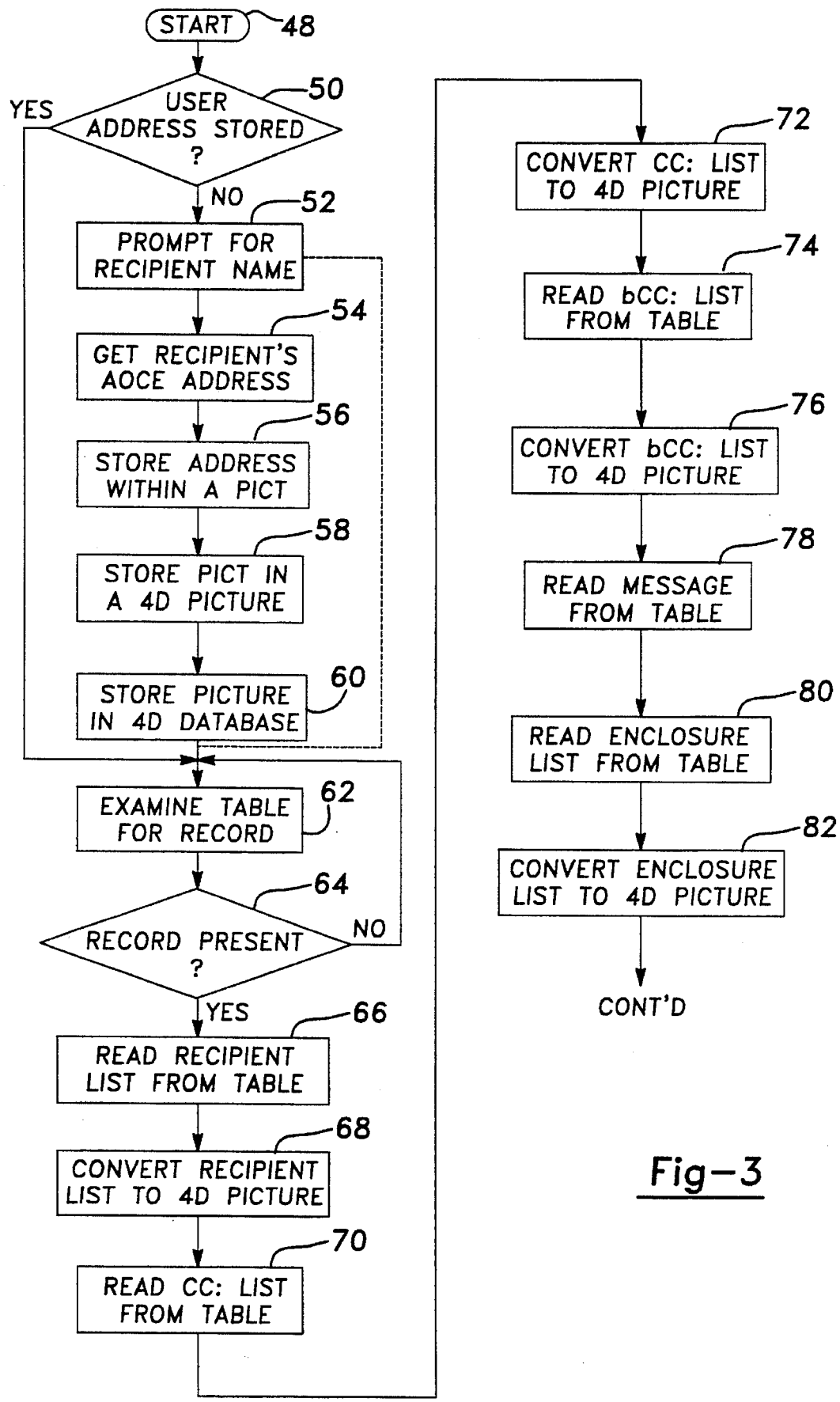
FIG. 3 is a flow diagram illustrating the method of the present invention.

FIG. 3 is a flow diagram illustrating the method of the present invention. The method begins at step 48. At step 50 it is initially determined if the network addresses for users, such as the recipient of a mail message to be sent, have previously been stored. If user names have not been stored, the method continues at step 52 where the user is prompted to provide a recipient name. For example, this may be a graphical prompting process in which a prompt message is provided to the user along with a list or graphical display of AOCE addresses. Each user on an AOCE-AppleTalk network is identified by an address which may be selected or designated by the user.

At step 54, the recipient's AOCE address is obtained. The AOCE address is a unique identifier which identifies the processing system of the recipient on the network. For example, in FIG. 1, processing system 14 may have an AOCE address corresponding to "Client 1" and processing system 18 may have an AOCE address corresponding to "PRIME." At step 56, the recipient's AOCE address is stored within a PICT data structure. At step 58, the PICT data structure is stored within a 4th Dimension picture variable, and at step 60, the 4th Dimension picture variable is stored in the 4th Dimension database 28 (FIG. 2).

Steps 52–60 may be repeated to load and store AOCE addresses for all potential recipients of electronic mail messages on the network. Steps 52–60 may be repeated, as indicated by the dashed line in FIG. 3, until all user addresses are stored as 4th Dimension picture variables in the 4th Dimension database.

After user addresses have been stored, or if at step 50, the user addresses were already stored, the method continues at step 62. At step 62, a predetermined storage location is read to determine, in step 64, if a data structure has been stored in the predetermined storage location. If no data structure has been stored in the predetermined storage location, operation remains in the loop comprising steps 62 and 64 until a data structure is read in the predetermined storage location.

Preferably, the loop comprising steps 62 and 64 is performed by a daemon process such as processing system 18 in FIG. 1. While the daemon process may have other functions, it preferably runs in a loop and watches for records to appear in the predetermined storage location. The predetermined storage location may be one or more storage locations or a table of storage locations within the "master copy" of the 4th Dimension database maintained at the server processing system 12 (FIG. 1), or may be any other previously defined storage location or locations on the network.

As envisioned by the preferred embodiment of the present invention, one or more 4th Dimension application programs or 4th Dimension externals writes a record into the predetermined storage location or table upon the occurrence of a predetermined event within the database system. For example, in the case where the database system implements an inventory and purchasing system, a purchase order may be prepared within the database using a database application program or external. After preparation, the purchase order is provided electronically to the preparer's supervisor for authorization. In this example, communication of the purchase order to the supervisor is the predetermined event. After the database application program or external conveys the purchase order to the supervisor, the application program or external writes a record to the predetermined storage location. The daemon process processing system, running in a loop comprising steps 62 and 64, detects this record and, in response, automatically informs the supervisor that the purchase order is awaiting attention. The daemon process processing system 18 (FIG. 1) automatically prepares an electronic mail message and conveys the electronic mail message to the supervisor to provide an indication of the occurrence of the event. Similarly, after the supervisor has authorized the purchase order, for example by attaching a digital signature to the purchase order, the application program or external again writes a record to the predetermined storage location. Again, the daemon process processing system which is running in the loop comprising steps 62 and 64 detects this record and automatically prepares an electronic mail message to the preparer of the purchase order and any other users who may be interested in the event. For example, notification might be provided to users responsible for accounting and purchasing.

Preferably, the record which is written to the predetermined storage location by the application program or external includes information needed to prepare the electronic mail message. Preferably, the record includes a list of recipients of the electronic mail message, including "carbon copy" recipients and "blind carbon copy" recipients. Also, preferably the record includes the text of a message to be conveyed to the recipients. The record may also include one or more files to be attached to the electronic mail message as "enclosures." Thus, the indication of the occurrence of the predetermined event within the database system includes at least a portion of the record or data structure written to the predetermined storage location. Alternatively, however, the record could only indirectly identify the message and its recipients, for example, by consisting of a pointer to a storage location containing a predetermined message and group of recipients.

The method continues at step 66, where the list of recipients of the electronic mail message to be prepared is read from the predetermined storage location. This list may be in any data format. At step 68, the list of recipients is converted to a PICT data format and encapsulated in a 4th Dimension picture. The 4th Dimension picture is stored in a predetermined storage location. At step 70, the list of "carbon copy" recipients of the message to be prepared is read from the predetermined storage location, and at step 72 this list is converted to PICT data and stored as a 4th Dimension picture. At step 74, the list of "blind carbon copy" recipients of the message to be prepared is read from the predetermined storage location, and at step 76 this list is converted to PICT data and stored in the database as a 4th Dimension picture. Due to the way that the 4th Dimension database system is arranged, arbitrary BLOB (binary large object) data, such as lists of recipient AOCE addresses and enclosure files, must be stored within the 4th Dimension database as picture variables.

At step 78, the text which forms the message of the electronic mail message to be formatted is read from the predetermined storage location. This data is then stored as a text variable in the database. At step 80, the list of enclosures and the enclosures themselves are read from the predetermined storage location and converted to PICT data which is encapsulated in a 4th Dimension picture, and stored in the database. The enclosures may be computer files having a predetermined format or may be random data, consisting of digital representations of audio, video, pictures or text data.

At step 84, it is determined whether the e-mail message to be prepared will contain a single enclosure. If this is the case, at step 86, the picture containing the enclosure data is read and the enclosure data is extracted from the picture. At step 88, the picture variables containing the recipient data, the "carbon copy" data and the "blind carbon copy" data are retrieved and the PICT data corresponding to each of these is extracted from the picture. At step 90, an electronic mail message is formatted using the recipient, "carbon copy" and "blind carbon copy" data, if provided, and the enclosure data. Thus, recipients will receive automatic notification from "PRIME" and know that the message was automatically generated by the database system to distinguish the message from messages generated by other users.

At step 92, it is determined if the message to be conveyed has more than a single enclosure. If this condition is true, at step 94 the enclosure data is extracted from the previously stored picture containing the enclosure data. At step 96, the message to be conveyed to the recipient is extracted from the previously stored picture containing the message data. At step 98, the recipient, "carbon copy" and "blind carbon copy" data is extracted from the previously stored pictures containing this data. At step 100, an electronic mail message is conveyed to the recipients defined by the recipient, "carbon copy" and "blind carbon copy" data. The message includes the message data as a text message and the enclosure data as the enclosure information accompanying the message. Preferably, the message is transmitted to the recipients by conveying the data defining the recipients and the enclosure data to electronic mail routines which are part of the Macintosh operating system. In addition, the "sender" of the electronic mail message is listed as the daemon process "PRIME" which is also the name used for the database application.

At step 102, if the message to be conveyed does not include enclosures, but is merely to include a textual message to the recipient, the message data is extracted from the previously stored 4th Dimension picture. At step 104, the recipient data, the "carbon copy" data and the "blind carbon copy" data are extracted from the previously stored pictures. At step 106, the electronic mail message is conveyed to the recipients defined by the recipient, "carbon copy" and "blind carbon copy" data with the message data defining the message. Preferably, the message is transmitted to the recipients by conveying the data defining the recipients and the enclosure data to electronic mail routines which are part of the Macintosh operating system. In addition, the "sender" of the electronic mail message is listed as the daemon process "PRIME" which is also the name used for the database application.

As can be seen from the foregoing, the present invention provides a method for automatically providing an indication of the occurrence of a predetermined event within a database system to one or more users of the database system. The system is especially adapted for use with Macintosh computers operating in conjunction with the 4th Dimension database system. The method uses features of the 4th Dimension database system, such as picture data format and picture variables, along with features of the Macintosh operating system, such as PowerTalk, to manipulate data and format the data for electronic mailing to one or more recipients. The method advantageously provides notification of the occurrence of conditions such as the provision of a digital signature or the occurrence of a database entry which requires a user who is not logged in to the database to respond in a timely and appropriate way. In addition, the method allows use of a common data transport mechanism, electronic mail, that in turn allows all electronic mail users, whether local or remote, to receive information concerning data events and results taking place within a database environment. Moreover, the method allows completion of a "paperless" office loop that provides the ability to notify users of events occurring within a database, further work to be performed, or other appropriate action, without the need to manually generate a separate electronic mail memorandum or manually telephone another individual to inform him of the event. Still further, the method allows automation of many processes that require communication between individuals based on time-dependent activities.

It is to be understood that, while the detailed drawings and specific examples given describe preferred embodiments of the invention, they are for the purpose of illustration only, that the apparatus of the invention is not limited to the precise details and conditions disclosed, and various changes may be made therein without departing from the spirit of the invention which is defined by the following claims.

We claim:

1. A method for providing an indication of the occurrence of a predetermined event within a database system, said database system storing data, said data being accessible by a plurality of users, said data being stored in a plurality of data formats, said plurality of data formats including a first data format, the method comprising the steps of:

using a daemon process operating independently from said database system to automatically and repetitively read a predetermined storage location within said database;

detecting a data structure having said first data format stored in said predetermined storage location;

reading said data structure;

converting said data structure from said first data format to a second data format; and providing said indication to at least one user of said plurality of users, said indication including at least a portion of said data structure.

2. A method for providing an indication of the occurrence of predetermined events within a database system as recited in claim 1 wherein said data structure comprises a message and wherein said converting step comprises converting said message to message data having a text format.

3. A method for providing an indication of the occurrence of predetermined events within a database system as recited in claim 2 wherein said message comprises enclosures and wherein said converting step comprises converting said enclosures to enclosure data having a PICT format.

4. A method for providing an indication of the occurrence of predetermined events within a database system as recited in claim 2 wherein the method comprises the further step of storing said message data having a text format as a first picture.

5. A method for providing an indication of the occurrence of predetermined events within a database system as recited in claim 4 wherein the method comprises the further step of storing said enclosure data having a PICT format as a second picture.

6. A method for providing an indication of the occurrence of predetermined events within a database system as recited in claim 4 wherein the method comprises the further steps of extracting said message data from said first picture.

7. A method for providing an indication of the occurrence of predetermined events within a database system as recited in claim 6 wherein the method comprises the further steps of creating an electronic mail message containing said indication and conveying said electronic mail message to said at least one user.

8. A method for providing an indication of the occurrence of predetermined events within a database system as recited in claim 7 wherein said indication comprises said message data.

9. A method for providing an indication of the occurrence of predetermined events within a database system as recited in claim 4 wherein the method comprises the further steps of extracting said enclosure data from said second picture.

10. A method for providing an indication of the occurrence of predetermined events within a database system as recited in claim 2 wherein said message comprises one or more recipient addresses and wherein said converting step comprises converting said one or more recipient addresses to address data having a PICT format.

11. A method for providing an indication of the occurrence of predetermined events within a database system as recited in claim 10 wherein the method comprises the further step of storing said address data having a PICT format as a second picture.

12. A method for providing an indication of the occurrence of predetermined events within a database system as recited in claim 11 wherein the method comprises the further steps of extracting said address data from said second picture.

13. A method for providing an indication of the occurrence of predetermined events within a database system as recited in claim 12 wherein the method comprises the further steps of creating an electronic mail message containing said indication and conveying said electronic mail message to said at least one user.

14. A method for providing an indication of the occurrence of predetermined events within a database system as recited in claim 13 wherein said indication comprises said message data and wherein said electronic mail is conveyed to said at least one user in response to said address data.

15. A method for providing an indication of the occurrence of a predetermined event within a database system, said database system storing data on a server processing system, said data being accessible by a plurality of client processing systems coupled to the server processing system on a network, said data being stored in a plurality of data formats, said plurality of data formats including a first data format, the method comprising the steps of:

- using a daemon process operating independently from said database system to automatically and repetitively scan a predetermined storage location within said database on said server processing system;
- detecting a data structure having said first data format stored in said predetermined storage location;
- reading said data structure;
- converting said data structure from said first data format to a second data format;
- providing said indication to at least one client processing system, said indication including at least a portion of said data structure.

16. A method for providing an indication of the occurrence of predetermined events within a database system as recited in claim 15 wherein said data structure comprises a message and wherein said converting step comprises converting said message to message data having a text format.

17. A method for providing an indication of the occurrence of predetermined events within a database system as recited in claim 16 wherein said indication is provided to said at least one client system by the further steps of creating an electronic mail message containing said message data in said text format and conveying said electronic mail message to said at least one client processing system.

* * * * *